United States Patent [19]

Hughes et al.

[11] Patent Number: 5,835,494
[45] Date of Patent: Nov. 10, 1998

[54] MULTI-LEVEL RATE SCHEDULER

[75] Inventors: David A. Hughes, Mountain View; Daniel E. Klausmeier, Sunnyvale, both of Calif.

[73] Assignee: Cisco Technology, Inc., San Jose, Calif.

[21] Appl. No.: 825,409

[22] Filed: Mar. 27, 1997

Related U.S. Application Data

[63] Continuation of Ser. No. 572,726, Dec. 14, 1995, abandoned.

[51] Int. Cl.$^6$ .................................................. H04L 12/56
[52] U.S. Cl. ......................... 370/397; 370/399; 370/232
[58] Field of Search .................... 370/232, 395, 370/397, 398, 399, 409, 412, 465, 468, 233, 235

[56] References Cited

U.S. PATENT DOCUMENTS

| | | | |
|---|---|---|---|
| 5,179,556 | 1/1993 | Turner et al. | 370/233 |
| 5,241,536 | 8/1993 | Grimble et al. | 370/398 |
| 5,463,620 | 10/1995 | Sriram | 370/412 |
| 5,499,238 | 3/1996 | Shon | 370/399 |
| 5,515,363 | 5/1996 | Ben-Nun et al. | 370/232 |
| 5,533,020 | 7/1996 | Bryn et al. | 370/395 |
| 5,577,035 | 11/1996 | Hayter et al. | 370/60 |

FOREIGN PATENT DOCUMENTS 2288097  10/1995  United Kingdom.

OTHER PUBLICATIONS

G. Mercankosk et al, "Multiplexing Spacer Outputs On Cell Emissions," Proceedings of INFOCOM '95 – Conference on Computer Communications, Fourteenth Annual Joint Conference. of the IEEE Computer and Communications Societies, Institute of Electrical and Electronics Engineers, Boston Apr. 2–6, 1995, vol. 3, pp. 49–55 (Apr. 2, 1995).

E. Wallmeier et al., "The Spacing Policer, An Algorithm for Efficient Peak Bit Rate Control in ATM Networks," Proceedings of the International Switching Symposium, vol. 2, pp. 22–26 (Oct. 25, 1992).

PCT Search Report mailed Apr. 14, 1997 for Counterpart PCT Appliction No.PCT US96/19947.

"An Event Driven EPRCA", ATM Forum Technical Committee Traffic Management Sub–working Group, Sep. 10, 1994, pp. 1–13.

Soung C. Liew, Kevin W. Lu, "Comparison of Buffering Strategies for Asymmetric Packet Switch Modules", IEEE Journal, 1991, vol. 9, No. 3, pp. 428–438.

*Primary Examiner*—Hassan Kizou
*Attorney, Agent, or Firm*—Blakely, Sokoloff, Taylor & Zafman LLP

[57] ABSTRACT

A method and apparatus are provided for scheduling when each of a plurality of virtual connections supported by a transmit device will be serviced by the transmit device. The transmit device includes a transmission control unit that uses a plurality of calendars to schedule when each of the plurality of virtual connections will be serviced. Virtual connections with faster transfer rates are scheduled using higher granularity calendars, while virtual connections with slower transfer rates are scheduled using lower granularity calendars. Each entry in the calendars is associated with a time interval ("cell slot") during which the transmit device is able to service one virtual connection. During a given cell slot, linked lists associated with the calendar entries that correspond to the cell slot are added to a service queue, and the virtual connection at the head of the service queue is serviced. After a virtual connection is serviced, the next service time for the virtual connection is scheduled by attaching the virtual connection to the head of a linked list associated with the appropriate entry of the appropriate calendar. The appropriate entry is determined by incrementing a fixed-point "desired service time" value that represents the cell slot for which the virtual connection was last scheduled, by a fixed-point inter-gap value that represents the how many cell slots ideally elapse between sequential service times of the virtual connection.

16 Claims, 4 Drawing Sheets

MULTI-LEVEL RATE SCHEDULER

This is a continuation of application Ser. No. 08/572,726, filed Dec. 14, 1995, now abandoned.

FIELD OF THE INVENTION

The present invention relates to network communications, and more specifically, to a method and apparatus for scheduling the transmission of cells that belong to multiple virtual connections.

BACKGROUND OF THE INVENTION

In Asynchronous Transfer Mode (ATM) networks, a virtual connection must be established before data can be transmitted from one device to another. To establish a virtual connection, various parameters associated with virtual connection must be specified. Such parameters include the identity of the source device, the identity of the destination device, and the transfer rate of the virtual connection. The rate at which cells are to be transferred through the ATM network may vary significantly from virtual connection to virtual connection. In addition, the rate of any given virtual connection may dynamically be changed.

When a virtual connection has been established between a source device and a destination device, data may be transferred by transmitting cells that contain the data from the source device to the destination device through one or more switches. The switches through which the data is transmitted determine when and where to forward the cells based on the parameters associated with the virtual connection on which the cells arrive.

Switches and end-systems ("transmit devices") transmit cells sequentially. The amount of time required to transmit a single cell is referred to as a "cell slot". A single transmit device may have to schedule the transmission of cells associated with thousands of virtual connections, where each of the virtual connections has a different transfer rate. Of all the cells that must be transmitted, only one cell can be transmitted in any particular cell slot. Consequently, the transmission of cells must be carefully scheduled in order to maintain the data transfer rates of each of the active virtual connections on the transmit device.

Various techniques have been developed to schedule the transmission of cells from numerous virtual connections in an order that maintains the transfer rates of the virtual connections. According to one prior art approach, each virtual connection accumulates a "credit" value at a rate that is determined by the transfer rate of the circuit. The higher the transfer rate of a virtual connection, the faster the virtual connection accumulates credit. During each cell slot, a cell from the virtual connection with the highest credit value (above some minimum threshold) is transmitted. When a cell from a particular virtual connection is transmitted, the credit value associated with that particular virtual connection is reset to zero.

The credit accumulation approach described above works well for systems that support relatively few virtual connections and have relatively long cell slots. However, as the number of active virtual connections increases and the duration of cell slots decreases, it becomes increasingly difficult to (1) increment the credit value of every virtual connection, (2) scan the credit value of every virtual connection to determine the virtual connection with the highest credit value, and (3) transmit a cell from the virtual connection with the highest credit value, all within the duration of a single cell slot.

According to another approach, nodes that correspond to the various virtual connections are linked together in a circular linked list. The number of nodes placed in the linked list for a particular virtual connection is based on the transfer rate of the virtual connection. For example, a virtual connection that has a transfer rate that is twice as fast as another virtual connection will have twice as many nodes in the linked list as the other virtual connection. During each cell slot, the transmit device simply services the virtual connection that corresponds to the node that is currently at the head of the circular linked list, then establishes the subsequent node in the linked list as the head of the linked list.

Ideally, the nodes for any given virtual connection are evenly spaced throughout the linked list, rather than clumped together. By evenly spacing the cells of a virtual connection, erratic short term swings in the transfer rate of the virtual connection are avoided. For example, it is preferable to transmit cells of a ten-cell-per-second virtual connection at the rate of one cell every tenth of a second, rather than transmitting a group of five cells every half second. Erratic short term swings in the transfer rate of a virtual connection due to a non-uniform time intervals between each cell transmission is referred to as cell jitter.

The circular linked list approach described above does not easily support a wide range of in transfer rates. For example, the virtual connection with the slowest transfer rate must have at least one node in the linked list. If there is a set of virtual connections with a transfer rate that is ten thousand times as fast as the slowest transfer rate, then the linked list must have at least ten thousand nodes for each virtual connection in the set. Thus, the wider the range of rates that are supported, the greater the amount of resources that will be required to maintain the circular linked list. Another disadvantage of the circular linked list approach is that, once the circular linked list has been established, it is difficult to dynamically change the transfer rates of the virtual connections represented in the linked list. Such rate changes could require huge numbers of nodes to be selectively removed from or added to the circular linked list while the list is being processed in real time.

Another approach to scheduling the transmission of cells has been developed by the ATM Forum Technical Committee, and is described in ATM Forum Document Number 94-0849 entitled "An Event Driven EPRCA". This approach uses a calendar-based scheduling mechanism to schedule the transmission of cells. One disadvantage of the calendar-based scheduling mechanism developed by the ATM Forum Technical Committee is that as the memory requirements increase dramatically the wider the range of supported transfer rates.

Based on the foregoing, it is clearly desirable to provide a mechanism for scheduling the transmission of cells that requires a relatively small amount of computer resources. It is further desirable to provide a mechanism for scheduling the transmission of cells that is able to economically support large numbers of virtual connections. It is further desirable to provide a mechanism for scheduling the transmission of cells that reduces the amount of cell jitter experienced by the various virtual connections. It is further desirable to provide a mechanism for scheduling the transmission of cells that is able to support a wide range of transfer rates without consuming a large amount of resources.

SUMMARY OF THE INVENTION

A method and apparatus are provided for scheduling when each of a plurality of virtual connections supported by a transmit device is serviced by the transmit device. The transmit device includes a transmission control unit that uses a plurality of calendars to schedule when each of the plurality of virtual connections will be serviced. Virtual connections with faster transfer rates are scheduled using higher granularity calendars, while virtual connections with slower transfer rates are scheduled using lower granularity calendars.

Each entry in the calendars is associated with a cell slot during which the transmit device is able to service one virtual connection. During a given cell slot, linked lists associated with the calendar entries that correspond to the cell slot are added to a service queue, and the virtual connection at the head of the service queue is serviced. After a virtual connection is serviced, the next service time for the virtual connection is scheduled by attaching the virtual connection to the head of a linked list associated with the appropriate entry of the appropriate calendar. The appropriate entry is determined by incrementing a fixed-point "desired service time" value (that represents the cell slot for which the virtual connection was last scheduled) by a fixed-point inter-gap value (that represents how many cell slots ideally elapse between successive service times of the virtual connection).

According to one aspect of the invention, a method is provided in which the calendar used to schedule the service time of a virtual connection is determined based on the transfer rate of the virtual connection. Specifically, if the transfer rate falls within a first range of transfer rates, then the service time for the virtual connection is scheduled using a first calendar. If the transfer rate falls within a second range of transfer rates, then the service time for the virtual connection is scheduled using a second calendar.

According to another aspect of the invention, a method is provided in which fixed-point arithmetic is used for scheduling a service time for a virtual connection. Specifically, a transfer rate of the virtual connection is determined. A fixed-point inter-cell gap value for the virtual connection is generated based on the transfer rate of the virtual connection. A fixed-point desired service time value is incremented by the fixed-point inter-cell gap value to generate a new fixed-point desired service time value. An entry in a calendar that corresponds to the new fixed-point desired service time value is determined. The virtual connection is then associated with the entry in the calendar.

According to yet another aspect of the invention, a method is provided for scheduling a service time for a virtual connection in which a virtual connection is scheduled for a cell slot by placing the virtual connection at the head of a linked list of virtual connections that are scheduled for the cell slot. Specifically, a calendar that includes a plurality of entries is created. Each of the plurality of entries is associated with a cell slot. The cell slot associated with each entry occurs a predetermined interval after the cell slot associated with the entry that immediately precedes the entry in the calendar.

The service time for the virtual connection is scheduled using the calendar by determining a cell slot for the virtual connection and adding the virtual connection to the head of a cell slot linked list associated with the entry of the plurality of entries that is associated with the cell slot.

A service queue that has a head and a tail is created. During each cell slot, the transmission control unit (1) establishes the entry of the plurality of entries associated with the cell slot as a current entry, (2) adds the cell slot linked list associated with the current entry to the tail of the service queue, and (3) services the virtual connection at the head of the service queue.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
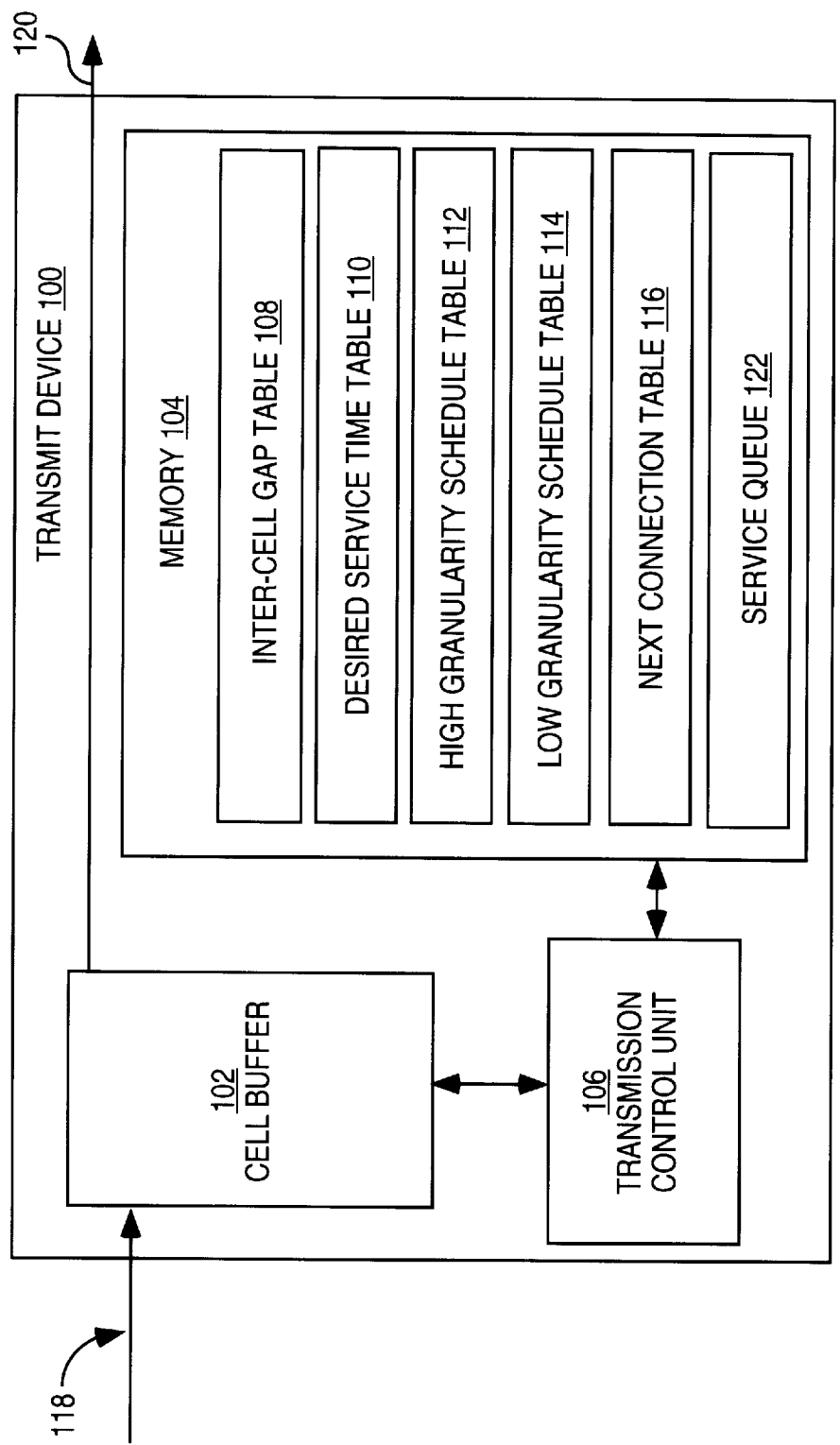
FIG. 1 is a block diagram of a transmit device configured according to one embodiment of the invention.

Referring to FIG. 1, it illustrates a transmit device 100 that includes a multiple-level cell transmission scheduling mechanism according to one embodiment of the invention. The transmit device 100 includes a cell buffer 102 that stores cells to be transmitted. The cells include headers that identify the virtual connection to which the cells belong. At any given time, cell buffer 102 may be storing cells for thousands of different virtual connections, each of which may have a different transfer rate.

In the illustrated embodiment, transmit device 100 is a switch that receives incoming cells over a line 118. However, the present invention is not limited to switching devices. Rather, the scheduling mechanism described herein may be implemented in any device that transmits data over numerous virtual channels that have have different transmission rates. Such devices include, for example, end-systems that originate messages that are to be sent over numerous virtual channels as well as the switches that are used to forward the messages to their intended destinations.

A transmission control unit 106 determines which of the cells currently stored in cell buffer 102 is to be transmitted out of transmit device 100 over line 120 during each cell slot. Specifically, during each cell slot, the transmission control unit 106 transmits a cell for the virtual connection that is at the head of a service queue 122 stored in a memory 104.

The embodiment illustrated in FIG. 1 has a single service queue. However, as shall be described in greater detail below, the present invention is not limited to the use of any particular number of service queues. For example, an alternative embodiment may include many service queues, where each service queue has a certain priority. The connections that are queued in service queues of lesser priority are serviced only when the service queues of higher priority are empty.

During each cell slot, the transmission control unit 106 must determine which virtual connections to add to the service queue 122. The transmission control unit 106 makes this determination based on the state of tables that the transmission control unit 106 maintains within memory 104. The tables used by transmission control unit 106 include an inter-cell gap table 108, a desired service time table 110, a high-granularity calendar 112, a low-granularity calendar 114 and a "next connection" table 116. The contents of each of these tables, and the method by which the transmission control unit 106 uses these tables to determine a servicing schedule for the virtual connections supported by transmit device 100 shall be described below with reference to FIG. 2.

TABLE CHARACTERISTICS

Figure 2:
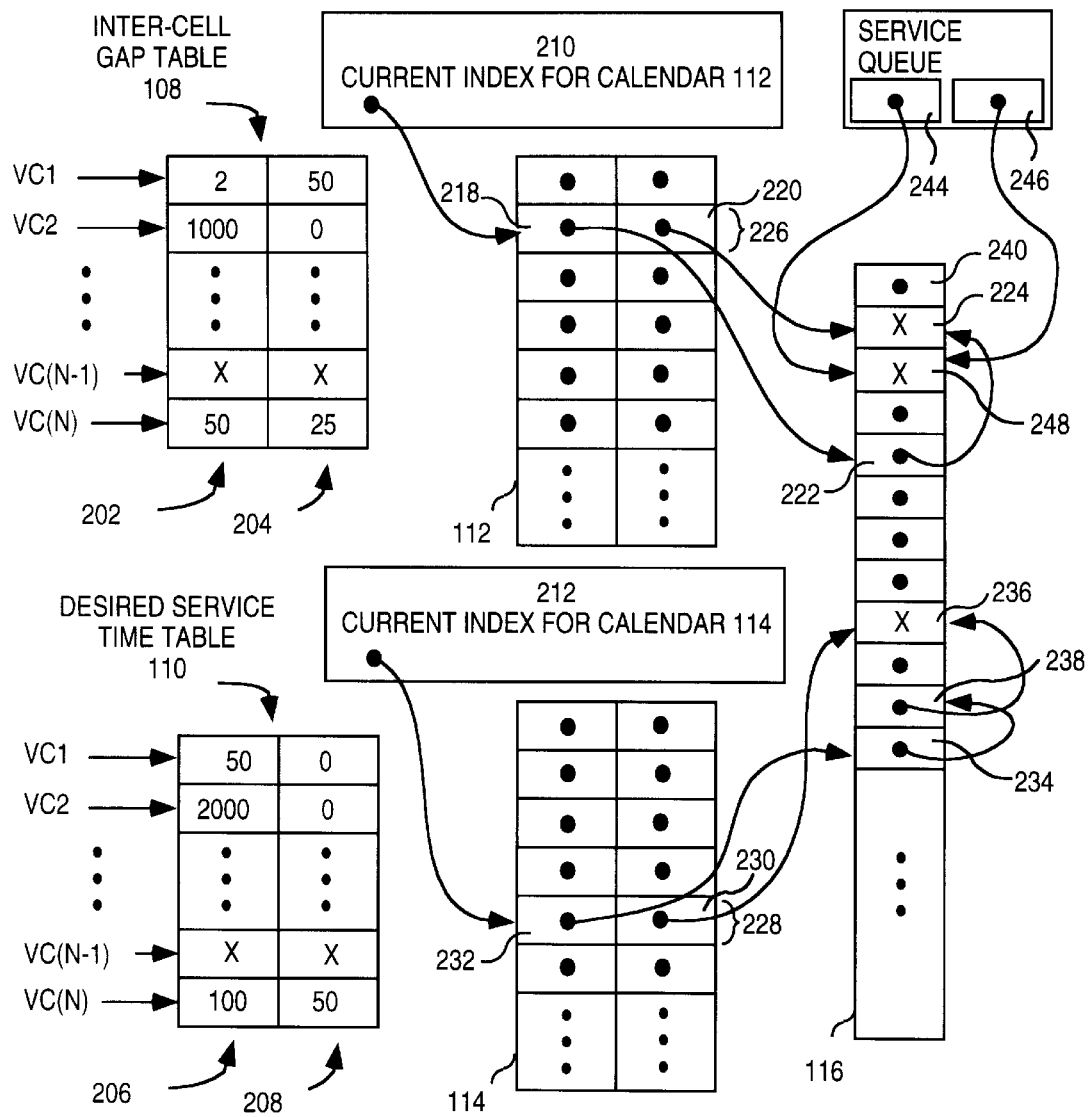
FIG. 2 is a block diagram illustrating the tables and pointers used to schedule the service times of virtual connections according to an embodiment of the invention.

Referring to FIG. 2, each of the inter-cell gap table 108, the desired service time table 110, and the "next connection" table 116 include as many entries as the maximum number of virtual connections supported by the transmit device 100. For the purpose of explanation, it shall be assumed that transmit device 100 is able to support up to sixteen thousand virtual connections. Therefore, inter-cell gap table 108, desired service time table 110, and "next connection" table 116 each contain sixteen thousand entries.

As mentioned above, each cell received by transmit device 100 contains a header that includes a connection identifier that uniquely identifies the virtual connection to which the cell belongs. These virtual connection identifiers are used to index into each of tables 108, 110, and 116, such that each virtual connection corresponds to a unique entry within each of tables 108, 110, and 116.

THE INTER-CELL GAP TABLE

Each entry in inter-cell gap table 108 includes a fixed-point number that specifies an inter-cell gap for the virtual connection to which the entry corresponds. The inter-cell gap of an entry indicates how many cell slots should elapse between successive transmissions of cells for the virtual connection that corresponds to the entry. For example, if the transfer rate of a virtual connection is one hundred cells per second, and the cell slot time of the transmit device 100 is one microsecond, then the inter-cell gap for the virtual connection would be ten thousand. The inter-cell gap for any given virtual connection may easily be determined by the formula: (transmit device transfer rate)/(virtual connection transfer rate)=inter-cell gap.

In the preferred embodiment, the values stored in inter-cell gap table 108 are fixed-point numbers. For example, each entry in inter-cell gap table may include a seventeen-bit value (in column 202) representing a quotient, and a seven-bit value (in column 204) representing a remainder. Fixed-point numbers are used to represent the inter-cell gaps rather than integers because the use of fixed-point numbers allows transmit device 100 to support transfer rates that do not evenly divide the transmit device transfer rate. For example, in a system with a one cell per microsecond transfer rate (i.e. one microsecond cell slots), a 400,000 cell per second transfer rate would require an inter-cell gap of 2.5.

In the exemplary inter-cell gap table 108 shown in FIG. 2, the inter-cell gap for a first virtual connection (VC1) is 2.50. A second virtual connection (VC2) has an inter-cell gap value of 1000. A third virtual connection (VC(N-1)) is not active, so the value stored in the entry of inter-cell gap table 108 for VC(N-1) is undefined. A fourth virtual connection (VC(N)) has an inter-cell gap value of 50.25.

THE DESIRED SERVICE TIME TABLE

Each entry in the desired service time table 110 includes a fixed-point number that specifies a desired service time for the virtual connection to which the entry corresponds. As shall be explained in greater detail below, the transmission control unit 106 schedules a servicing time for a given virtual connection based on the value stored in the desired service time table 110. Once a servicing time has been scheduled for a particular virtual connection, the transmission control unit 106 increments the desired service time value for the virtual connection by the inter-cell gap value for the virtual connection. The desired service time value will then reflect the time at which the next service of the virtual connection should be scheduled.

As with the inter-cell gap values, the desired service time values are stored as fixed-point numbers rather than integers. For example, in one embodiment each desired service time value includes a seventeen-bit integer portion (stored in column 206) and a seven-bit fractional portion (stored in column 208). However, a cell transmission must be scheduled for a specific desired cell slot. The specific desired cell slot may therefore be determined by converting the desired service time value to an integer value. Any one of numerous conversion functions may be used to perform this conversion, such as truncation or rounding. The present invention is not limited to any particular function for converting fixed-point numbers to integers.

In the illustrated example, VC1, VC2 and VC(N) have the desired service time values 50, 2000 and 100.50, respectively. VC(N-1) is not currently active, so the desired service time value for VC(N-1) is undefined. As shall be explained in greater detail below, the desired service time value of a virtual connection is used by transmission control unit 106 to determine a "time slot linked list" into which the virtual connection is inserted.

THE CALENDARS

Each entry in each of the calendars 112 and 114 corresponds to a desired service time. Transmission control unit 106 schedules the service time of a virtual connection for a particular cell slot by placing the virtual connection in a linked list associated with a calendar entry that corresponds to the cell slot. Using the scheduling techniques that shall be described below, the transmission control unit 106 may schedule more than one cell to be transmitted during a particular time slot. Therefore, rather than simply storing a virtual connection in a calendar entry, each entry in each calendar contains a head pointer and a tail pointer that point to the head and tail of a linked list of virtual connections that have been assigned to the cell slot associated with the entry. Such linked lists shall be referred to hereafter as "cell slot linked lists".

Specifically, the head pointer of a calendar entry points to the entry in the "next connection" table 116 that corresponds to the virtual connection that is at the head of its cell slot linked list. The tail pointer of a calendar entry points to the entry in the "next connection" table 116 that corresponds to the virtual connection that is at the tail of its cell slot linked list.

In the illustrated example, high-granularity calendar 112 includes an entry 226 with a head pointer 208 that points to an entry 222 in "next connection" table 116 and a tail pointer 220 that points to an entry 224 in "next connection" table 116. Thus, the virtual connections that correspond to entries 222 and 224 are respectively at the head and tail of the cell slot linked list of virtual connections that have been assigned to the cell slot associated with entry 226.

Low-granularity calendar 114 includes an entry 228 with a head pointer 232 and a tail pointer 230. Head pointer 232 points to an entry 234 of "next connection" table 116. Tail pointer 230 points to an entry 236 of "next connection" table 116. Thus, the virtual connections that correspond to entries 234 and 236 are respectively at the head and tail of the cell slot linked list of virtual connections that have been assigned to the cell slot associated with entry 228.

As mentioned above, only one cell may actually be transmitted during any given cell slot. A scheduling conflict arises when two or more virtual connections have been scheduled to be serviced during the same cell slot. The mechanism for resolving such scheduling conflicts shall be described in detail below.

THE NEXT VIRTUAL CONNECTION TABLE

As explained above, each entry in the "next connection" table 116 corresponds to a virtual connection. Each "next connection" entry contains a pointer that either points to another "next connection" entry or is set to NULL. The pointers stored in the "next connection" entries reflect the order in which the virtual connections appear in the cell slot linked lists. Thus, if a first virtual connection immediately precedes a second virtual connection in a cell slot linked list, then the "next connection" entry that corresponds to the first virtual connection contains a pointer to the "next connection" entry that corresponds to the second virtual connection. If a virtual connection is the last virtual connection in a cell slot linked list, then the pointer in the "next connection" entry that corresponds to the virtual connection is set to NULL.

In the illustrated example, the pointer stored in entry 222 points to entry 225 to indicate that the virtual connection associated with entry 222 is followed by the virtual connection associated with entry 224. The pointer in entry 224 is set to NULL to indicate that no virtual connection follows the virtual connection associated with entry 224. Therefore, the cell slot linked list associated with entry 226 includes only the virtual connection associated with entry 222 and the virtual connection associated with entry 224, in that order.

The pointer stored in entry 234 points to entry 238 to indicate that the virtual connection associated with entry 234 is followed by the virtual connection associated with entry 238. The pointer stored in entry 238 points to entry 236 to indicate that the virtual connection associated with entry 238 is followed by the virtual connection associated with entry 236. The pointer stored in entry 236 is set to NULL to indicate that no virtual connections follow the virtual connection associated with entry 236. Therefore, the cell slot linked list associated with entry 228 consists of the virtual connection associated with entry 234, the virtual connection associated with entry 238, and the virtual connection associated with entry 236, in that order.

OPERATION OF THE TRANSMISSION CONTROL UNIT

In addition to the various tables described above, memory 104 also includes a pointer 210 that is used as an index to high-granularity calendar 112, and a pointer 212 that is used as an index to low-granularity calendar 114. The entry indicated by pointer 210 is referred to as the "current entry" of high-granularity calendar 112. The entry indicated by pointer 212 is referred to as the "current entry" of low-granularity calendar 114.

Transmission control unit 106 increments pointer 210 at a first predetermined rate, and increments pointer 212 at a second predetermined rate. For the purposes of explanation, it shall be assumed that pointer 210 is incremented every microsecond, and that pointer 212 is incremented every millisecond. When pointers 210 and 212 reach the end of their respective tables, the pointers wrap around to the beginning of the tables.

Transmission control unit 106 performs the same operations with each increment of pointer 210 as it performs with each increment of pointer 212, with the exception that the operations are performed based on the current entry of high-granularity calendar 112 when pointer 210 is incremented, and performed based on the current entry of low-granularity calendar 114 when pointer 212 is incremented. To avoid unnecessary duplication of description, the operation of transmission control unit 106 shall be described below with reference to what occurs when pointer 210 is incremented, with the understanding that the same operations are performed in parallel on low-granularity calendar 114 by transmission control unit 106 when pointer 212 is incremented.

When pointer 210 is incremented, pointer 210 points to a new entry in high-granularity calendar 112 which becomes the "current entry". For the purposes of explanation, the cell slot linked list that is associated with the new current entry is referred to hereafter as the "current cell slot linked list". In response to pointer 210 being incremented, the transmission control unit 106 attaches the current cell slot linked list to the tail of the service queue 122. During each cell slot, transmission control unit 106 services the virtual connection that is currently at the head of the service queue 122, removes the virtual connection from the head of the service queue 122 and schedules the next service time of the of the virtual connection. Each of these steps shall be described in greater detail below.

ATTACHING THE CURRENT VIRTUAL CONNECTION LINED LIST

The transmission control unit 106 maintains a head pointer 244 and tail pointer 246 to indicate the head and tail of the service queue 122. The head pointer 244 points to the entry in the "next connection" table 116 that is associated with the virtual connection that is at the head of the service queue 122. The tail pointer 246 points to the entry of "next connection" table 116 that is at the tail of the service queue 122. In the illustrated example, the service queue 122 includes only the virtual connection associated with entry 248 of "next connection" table 116. Therefore, both pointers 244 and 246 point to entry 248.

The transmission control unit 106 attaches the current cell slot linked list to the tail of the service queue 122 by causing the pointer of the "next connection" entry that is currently at the tail of the service queue 122 to point to the head of the current cell slot linked list, and causing the tail pointer 246 to point to the "next connection" entry at the tail of the current cell slot linked list. For example, assume that entry 248 is the only entry in the service queue 122, and the current cell slot linked list is the linked list associated with entry 226 of high-granularity calendar 112. To attach the linked list associated with entry 226 to the service queue 122, the transmission control unit 106 first causes the pointer in entry 248 to point to entry 222, and then causes the tail pointer 246 to point to entry 224. After these operations are performed, the service queue will consist of entries 248, 222 and 224, in that order.

By attaching the current cell slot linked list to the tail of the service queue 122, the transmission control unit 106 ensures that the cells from the current virtual connections will be serviced immediately after any virtual connections that reside in the service queue 122 prior to the attachment of the current cell slot linked list are serviced. After the current cell slot linked list is attached to the service queue 122, the current entry of high-granularity calendar 112 ceases to correspond to the current cell slot, and begins to correspond to the cell slot that will occur when pointer 210 returns to the current entry after wrapping around high-granularity calendar 112. At this point, no virtual connections have yet been scheduled to the new cell slot to which the current entry corresponds. Therefore, the pointers within the current entry of high-granularity calendar 112 are set to NULL.

SERVICING A VIRTUAL CONNECTION

Control circuitry within transmission control unit 106 causes a cell to be transmitted during each cell slot. According to one embodiment, the cells are transmitted in the order indicated by the service queue 122. Specifically, during each cell slot, the transmission control unit 106 reads the virtual connection identifier at the head of the service queue 122. The transmission control unit 106 then determines the location within cell buffer 102 of the oldest cell for the identified virtual connection.

To determine the oldest cell for a particular virtual connection, the transmission control unit 106 may maintain a "received cell" linked list for each virtual connection. When a cell arrives for a particular virtual connection, the cell is stored in cell buffer 102, and data identifying where the cell is stored is added to the tail of the "received cell" linked list for the virtual connection on which the cell was received. Using this technique, the "received cell" linked list for each virtual connection will reflect the order in which cells arrived for the virtual connection. The oldest stored cell for a virtual connection will be located at the location specified in the head node of the "received cell" linked list for the virtual connection. When the "oldest cell" of a virtual connection is transmitted, the node corresponding to the oldest cell is removed from the head of the "received cell" linked list for the virtual connection.

It should be noted that the maintenance of "received cell" linked lists for each virtual connection is merely one method for determining the location of the oldest cell for a particular virtual connection. The present invention is not limited to any particular method of determining the oldest cell for a particular virtual connection. Further, in some applications it may not be necessary to strictly maintain the order of the cells for a particular connection. In such applications, any cell from the particular connection may be transmitted, or the cell to be transmitted on the connection may be selected based on some criteria other than the order in which the cell arrived or was generated.

MULTIPLE SERVICE QUEUES

According to an alternative embodiment, transmission control unit 106 maintains separate service queues for each of the calendars. When the pointer 210 for high-granularity calendar 112 is incremented, the virtual connections associated with the current entry of high-granularity calendar 112 are placed on a first service queue. When the pointer 212 for low-granularity calendar 114 is incremented, the virtual connections associated with the current entry of low-granularity calendar 114 are placed on a second service queue.

The transmission control unit 106 is configured to service the virtual connection at the head of the service queue associated with the highest granularity schedule (i.e. the first service queue). During cell slots in which the service queue associated with the highest granularity schedule is empty, the transmission control unit 106 services the virtual connection at the head of the service queue associated with the lower granularity schedule (i.e. the second service queue). In this embodiment, transmissions for the virtual connections with lower transfer rates are less likely to cause cell jitter in the virtual connections with higher transfer rates.

NO SHOW CONDITIONS

According to one embodiment, transmissions for virtual connections are scheduled without regard to whether any cells have arrived over the virtual connections. Under these circumstances, it is possible that cell buffer 102 does not contain any cells for the virtual connection at the head of the service queue 122. This is referred to as a "no show" condition. When a no show condition occurs during a particular cell slot, transmission control unit 106 uses the cell slot to service the next connection in the service queue 122.

In the preferred embodiment, transmission control unit 106 operates at a speed that allows transmission control unit 106 to attempt to service a number of virtual connections in a particular cell slot. Thus, even if the first three virtual connections in the service queue 122 create no show conditions, the transmission control unit 106 is able to process the three virtual connections and service the fourth virtual connection during a single cell slot.

SCHEDULING THE NEXT TRANSMISSION OF A VIRTUAL CONNECTION

At any given time, each virtual connection has one service time scheduled. When a virtual connection is serviced, the entry in "next connection" table 116 for the virtual connection is removed from the head of the service queue 122 and the next service time of the virtual connection is scheduled. The next service time of a virtual connection is scheduled by (1) determining a cell slot in which the next cell of the connection should be sent, and (2) adding the virtual connection to the cell slot linked list associated with appropriate cell slot. This process shall be explained with reference to FIGS. 3 and 4.

Figure 3:
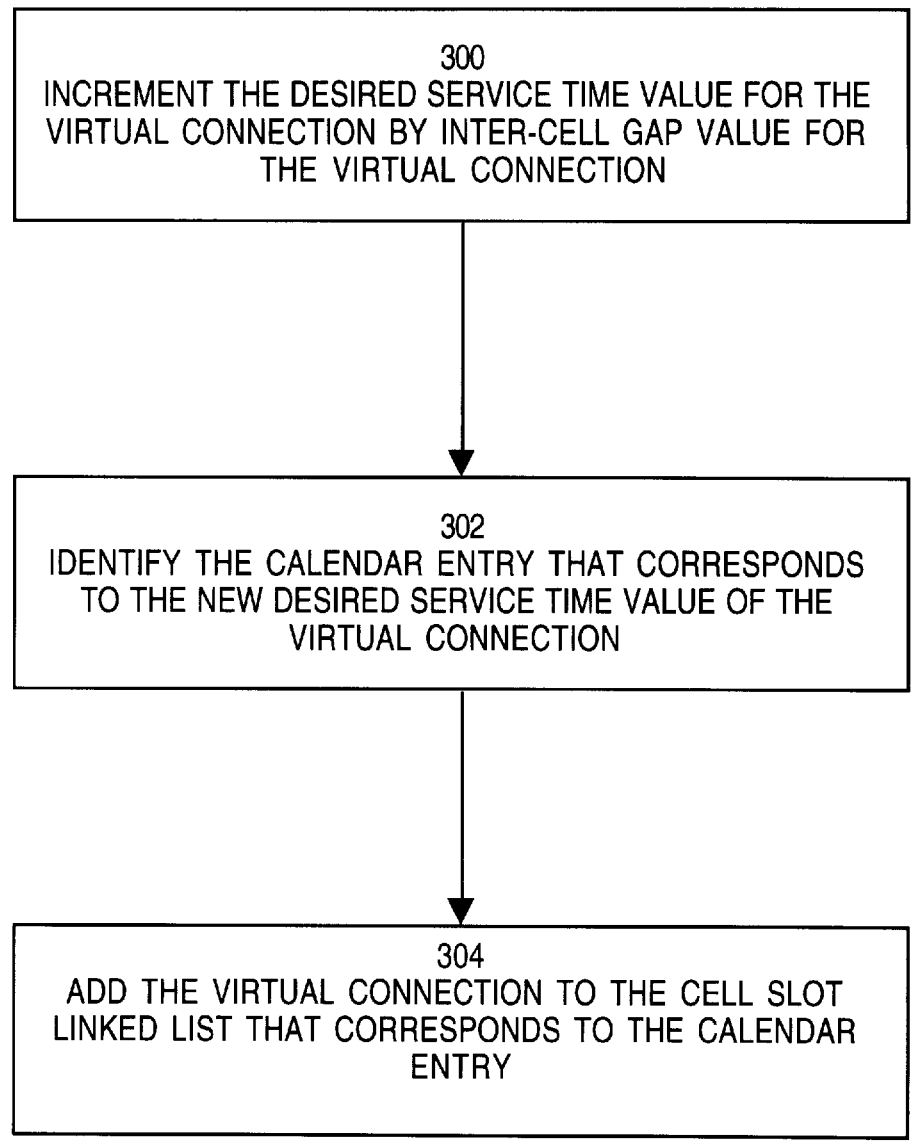
FIG. 3 is a flow chart illustrating steps for scheduling when a virtual connection should be next serviced.

Referring to FIG. 3, it is a flow chart illustrating the general steps performed by transmission control unit 106 to schedule the next transmission of a virtual connection that has been serviced. At step 300, transmission control unit 106 increments the desired service time value for the virtual connection by the inter-cell gap value of the virtual connection. For example, assume that VC1 has just been placed in the service queue 122. Transmission control unit 106 performs step 300 for VC1 by incrementing the desired service time value for VC1 by the inter-cell gap value for VC1. In the illustrated example, the new desired service time value produced by this operation would be 52.5 (i.e. 50+2.50).

Once the new desired service time value has been determined, control proceeds to step 302. At step 302, the transmission control unit 106 identifies the calendar entry that corresponds to the new desired service time value. In the present example, the new desired service time value is 52.5. Therefore, the calendar entry determined at step 302 will be the entry of high-granularity calendar 112 that corresponds to cell slot 52, assuming that the truncation function is used to convert the desired service time values to integers.

When the calendar entry that corresponds to the new desired service time value has been determined, control passes to step 304. At step 304, the virtual connection at issue is added to the cell slot linked list that is associated with the calendar entry determined in step 302. The steps for adding a virtual connection to a cell slot linked list are illustrated in FIG. 4.

ADDING A VIRTUAL CONNECTION TO A CELL SLOT LINKED LIST

Figure 4:
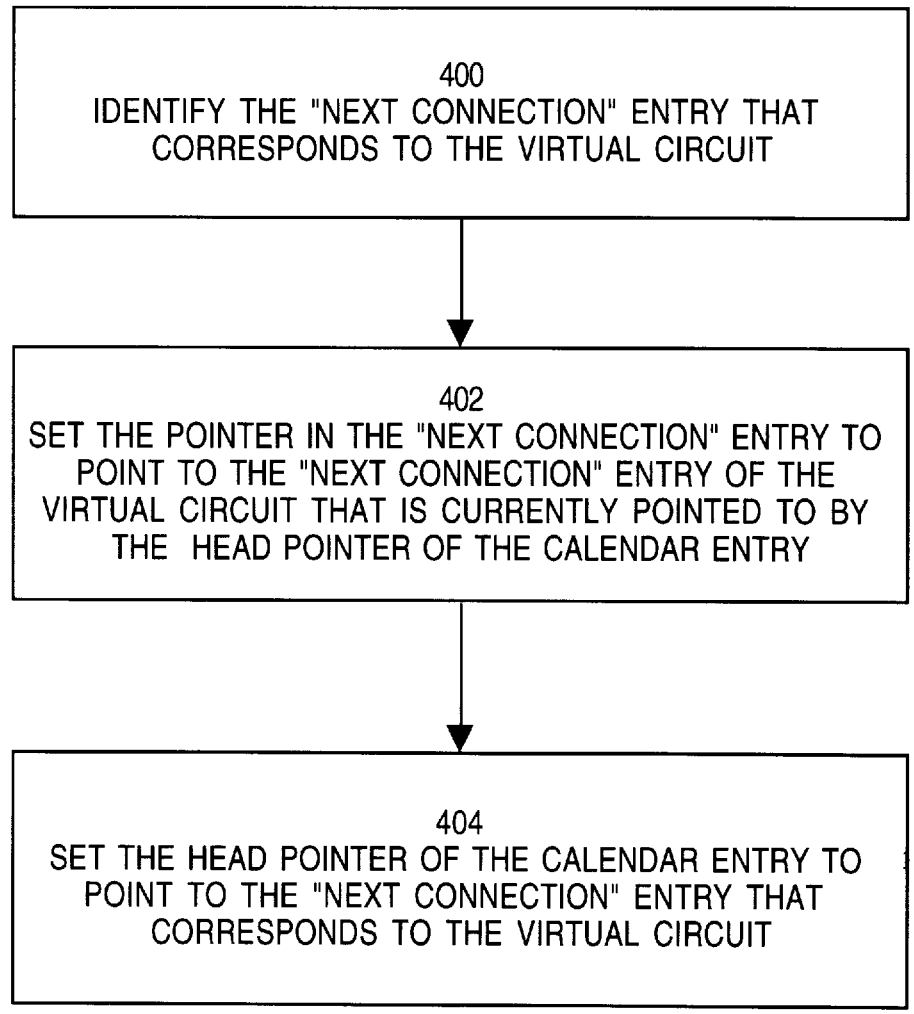
FIG. 4 is a flow chart illustrating steps for adding a virtual connection to the head of a cell slot linked list.

Referring to FIG. 4, it is a flow chart illustrating the steps for adding a virtual connection to a cell slot linked list. At step 400, the "next connection" entry that corresponds to the virtual connection is identified. At step 402, the pointer in the "next connection" entry is set to point to the entry that corresponds to the virtual connection that is currently pointed to by the head pointer of the calendar entry.

For example, assume that VC1 is to be added to the cell slot linked list associated with entry 226 of high-granularity calendar 112. Assume also that entry 240 of "next connection" table 116 corresponds to VC1. At step 402, the pointer stored in entry 240 is updated to point to the entry indicated by the head pointer 218 of entry 226. Head pointer 218 points to entry 222 of "next connection" table 116. Therefore, the pointer stored in entry 240 is updated to point to entry 222.

At step 404, the linked list head pointer of the calendar entry is set to point to the "next connection" entry that corresponds to the virtual connection. In the example given above, the "next connection" entry that corresponds to VC1 is entry 240. Therefore, at step 404 the head pointer 218 of entry 236 is updated to point to entry 240. After this step is completed, the cell slot linked list associated with entry 226 will consist of the virtual connections that correspond to entries 240, 222 and 224, in that order.

RESCHEDULING PROBLEMS

Under heavy traffic conditions, the service queue 122 may become long. It is possible for a virtual connection's next desired service time to pass while the virtual connection awaits its turn to be serviced. For example, assume that each cell slot is one microsecond. Assume that a particular virtual connection has a transfer rate of one cell per five microseconds. At a time T, the virtual connection is placed in the service queue 122 that already includes eight virtual connections. At time T+8, the virtual connection will be serviced and the next service time for the virtual connection will be scheduled. However, the desired service time for the virtual connection will be at time T+5, which has already passed.

According to one embodiment, transmission control unit 106 is configured to place the virtual connection immediately back onto the service queue 122 under these circumstances. According to another embodiment, the transmission control unit 106 places the virtual connection into the cell slot linked list associated with the next calendar entry to be processed. In either case, cells from the virtual connections represented in the service queue 122 are sent during cell slots in which no virtual connections have been scheduled in order to "catch up" by reducing the size of the service queue 122. However, if the current cell slot is too far ahead of the desired transmission time value of a virtual connection, then the transmission control unit 106 resets the desired service time value of the virtual connection to a value that reflects the current cell slot.

MULTIPLE-LEVEL SCHEDULING

The process of transmitting cells based on a schedule, and rescheduling cells based on an inter-cell gap values and desired service time values has been described above with reference to high-granularity calendar 112. As explained above, the same transmission and rescheduling process is concurrently being performed based on the current entry of low-granularity calendar 114 every time pointer 212 is incremented.

As also mentioned above, the pointer 212 used as an index into low-granularity calendar 114 is incremented at a different rate than the pointer 210 that is the index for high-granularity calendar 112. In the present example, it is assumed that pointer 210 is incremented every microsecond, while pointer 212 is incremented every millisecond. Therefore, adjacent entries of high-granularity calendar 112 correspond to cell slots separated by one microsecond, while adjacent entries of low-granularity calendar 114 correspond to cell slots separated by one millisecond.

Because the granularity of calendars 112 and 114 is different, the calendars 112 and 114 cover different ranges of transfer rates. The specific range of transfer rates supported by a table is determined by the size of the table, and the rate at which entries in the table are processed. For example, assume that high-granularity calendar 112 is processed at the rate of one entry per microsecond, and includes 1000 entries. Under these conditions, high-granularity calendar 112 could be used to schedule virtual connections with transfer rates from one-cell-per-microsecond to one-cell-per-millisecond. If low-granularity calendar 114 is processed at the rate of one entry per millisecond and includes 1000 entries, then low-granularity calendar 114 could be used to schedule virtual connections with transfer rates from one-cell-per-millisecond to one-cell-per-second.

When a virtual connection is initially established, the transmission control unit 106 determines whether to schedule the virtual connection using high-granularity calendar 112 or low-granularity calendar 114. If the transmission rate of the virtual connection is above a threshold rate, high-granularity calendar 112 is used to schedule the transmission of the cells for the virtual connection. If the transmission rate of the virtual connection is below the threshold rate, then low-granularity calendar 114 is used to schedule the transmission of the cells for the virtual connection. The process performed by transmission control unit 106 to schedule the service time of a new virtual connection shall be described in greater detail below.

One advantage of having multiple calendars that are processed at different rates, rather than a single calendar, is that the amount of memory required for a single table implementation increases dramatically the wider the range of transfer rates of the supported virtual connections. For example, assume that a single calendar is used to schedule cell transmissions for two virtual connections: a first virtual connection with a two cell per three microsecond transfer rate, and a second virtual connection with a one cell per hundred millisecond transfer rate. To accurately schedule transmissions for the first virtual connection, each entry in the calendar would have to correspond to a time slot no greater than one microsecond. When a virtual connection indicator for the second virtual connection is added to the service queue 122, the subsequent transmission for the second virtual connection must be scheduled for one hundred milliseconds in the future. If each entry in the calendar is one microsecond, then the entry that represents one hundred milliseconds in the future would be 100,000 entries after the current entry. Therefore, the single table would have to have at least 100,000 entries.

In contrast, the multiple-level scheduling system illustrated in FIG. 2 would schedule the first transaction using high-granularity calendar 112, and the second transaction using schedule low-granularity calendar 114. In low-granularity calendar 114, the entry that represents one hundred milliseconds in the future is only 100 entries after the current entry. Therefore, the transfer rates of the first and second virtual connections could be supported with much fewer than 100,000 calendar entries.

As described above, the transmission control unit 106 uses a plurality of scheduling tables to schedule cell transmissions. The illustrated example uses two scheduling calendars 112 and 114. However, the present invention is not limited to any specific number of scheduling tables. For example, three scheduling tables may be used to schedule the transmission of cells, where pointers to each of the three tables are incremented at different rates. For example, pointers for the three tables may be incremented every microsecond, every millisecond, and every hundredth of a second, respectively.

SCHEDULING A NEW VIRTUAL CONNECTION

When a virtual connection is initially activated, transmission control unit 106 determines the inter-cell gap value for the new virtual connection based on the transfer rate of the new virtual connection. The transmission control unit 106 places the virtual connection on the service queue 122 during the current cell slot. The transmission control unit 106 then determines a desired service time value for the new virtual connection by adding the value of the current cell slot with the inter-cell gap. The transmission control unit 106 then schedules the next transmission for the virtual connection by adding the virtual connection to the cell slot linked list that corresponds to the determined desired service time value.

In an alternative embodiment, the new virtual connection is inserted in the cell slot linked list associated with the calendar entry that will be processed during the next cell slot. In this embodiment, the desired service time value is determined by adding the value associated with the next cell slot to the inter-cell gap value of the new virtual connection.

If the new virtual connection has a relatively high transfer rate, then the transmission control unit 106 will schedule the virtual connection by inserting the virtual connection into a cell slot linked list associated with an entry of high-granularity calendar 112. For example, if the transfer rate of the new virtual connection is one cell per ten microseconds, then the virtual connection will be added to the cell slot linked list associated with the entry of high-granularity calendar 112 that resides ten entries below the current entry of high-granularity calendar 112.

On the other hand, if the new virtual connection has a relatively low transfer rate, then the transmission control unit 106 schedules the virtual connection by inserting the virtual connection into a cell slot linked list associated with an entry of low-granularity calendar 114. For example, if the transfer rate of the new virtual connection is one cell per ten milliseconds, then the virtual connection will be added to the cell slot linked list associated with the entry of low-granularity calendar 114 that resides ten entries below the current entry of low-granularity calendar 114.

OVERLAPPING CALENDARS

As mentioned above, the specific calendar used to schedule a particular virtual connection is selected by transmission control unit 106 based on the transfer rate of the virtual connection. According to one embodiment, the calendars overlap such that it is possible to schedule virtual connections with certain transfer rates in more than one calendar. For example, consider a system that uses two calendars. Entries for the first calendar are processed at a rate of one-per-microsecond, and entries for the second calendar are processed at the rate of one-per-millisecond. Assume that both tables have four thousand entries.

Under these assumptions, a virtual connection with a transfer rate of one cell for every two milliseconds could be scheduled using either of the calendars. If the first table is used, then the virtual connection indicator for the virtual connection would be inserted into the cell slot linked list associated with the entry located two thousand entries after the current entry of the first table. If the second table is used, then the virtual connection indicator for the virtual connection would be inserted into the cell slot linked list associated with the entry located two entries after the current entry of the second table.

When more than one calendar could be used to schedule transmissions for a particular virtual connection, as described above, the transmission control unit 106 schedules transmissions for the virtual connection using the scheduling table with the highest processing granularity. Thus, in the example given above, transmissions for the one cell per two millisecond virtual connection would be scheduled using the first table, which is processed at one entry per microsecond. The benefit of using the higher-granularity table in such situations is that it is generally less likely for scheduling conflicts to occur in the higher-granularity schedule than the lower-granularity schedule.

A second benefit to using the higher granularity schedule in such situations is that as a general rule the slower virtual connections will tend to outnumber the faster virtual connections. This rule is due to the fact that a large number of high transfer rate virtual connections would exceed the throughput of the transmit device, while a large number of slower transfer rate virtual connections will not. Therefore, if a transmit device is supporting a large number a virtual connections, most of the virtual connections must have transfer rates much slower than the total throughput of the transmit device. Because there are relatively fewer high-speed virtual connections, the higher granularity schedule will be less densely populated than the lower granularity schedule. Consequently, the higher-granularity schedule is used to schedule any virtual connections that are fast enough to be scheduled with the higher granularity schedule.

LIFO LINKED LISTS

As mentioned above, when a virtual connection is scheduled for a particular cell slot, the virtual connection is added to the head of the cell slot linked list associated with the cell slot rather than the tail of the cell slot linked list. Because virtual connections are added to the head of cell slot linked lists and serviced in order once the cell slot linked list is placed on the service queue, the later a virtual connection is added to a particular cell slot linked list, the sooner it will be serviced. Each cell slot linked list is therefore a Last-In-First-Out (LIFO) linked list.

While the present invention may be implemented with FIFO cell slot linked lists, LIFO cell slot linked lists are preferred because they ensure that the higher speed virtual connections scheduled for a particular cell slot will be serviced before the slower virtual connections scheduled for the same cell slot. This result occurs because the faster the transfer rate of a virtual connection, the more recent will be the cell slot in which it was last serviced. Since virtual connections are scheduled at the time they are serviced, the faster transfer rate of a virtual connection, the more recently it will have been added to a particular cell slot linked list. By servicing faster virtual connections before slower virtual connections that are scheduled for the same cell slot, the cell jitter of the faster virtual connections is significantly reduced.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for scheduling a service time for a virtual connection, the method comprising the computer-implemented steps of:

determining a transfer rate associated with said virtual connection;

if said transfer rate falls within a first range of transfer rates, then scheduling said service time for said virtual connection using a first calendar; and if said transfer rate falls within a second range of transfer rates, then scheduling said service time for said virtual connection using a second calendar.

2. The method of claim 1 wherein:

said first calendar includes a first plurality of entries;

each of said first plurality of entries is associated with a cell slot;

the cell slot associated with each entry in said first plurality of entries occurs a first predetermined interval after the cell slot associated with the entry that immediately precedes said entry in said first calendar;

said step of scheduling said service time for said virtual connection using said first calendar includes the steps of:

determining a cell slot for said virtual connection; and associating said virtual connection with the entry of said first plurality of entries that is associated with said cell slot;

said second calendar includes a second plurality of entries;

each of said second plurality of entries is associated with a cell slot;

the cell slot associated with each entry in said second plurality of entries occurs a second predetermined interval after the cell slot associated with the entry that immediately precedes said entry in said second calendar, said second predetermined interval being different from said first predetermined interval;

said step of scheduling said service time for said virtual connection using said second calendar includes the steps of:

determining a cell slot for said virtual connection; and associating said virtual connection with the entry of said second plurality of entries that is associated with said cell slot.

3. The method of claim 2 wherein:

the step of associating said virtual connection with the entry of said first plurality of entries that is associated with said cell slot includes the step of adding the virtual connection to a cell slot linked list associated with said cell slot; and the step of associating said virtual connection with the entry of said second plurality of entries that is associated with said cell slot includes the step of adding the virtual connection to a cell slot linked list associated with said cell slot.

4. The method of claim 3 wherein:

the cell slot linked list associated with said cell slot has a head and a tail; and the step of adding the virtual connection to a cell slot linked list associated with said cell slot includes the step of adding the virtual connection to the head of said cell slot linked list.

5. The method of claim 2 wherein:

said step of determining a cell slot for said virtual connection includes the steps of generating an inter-cell gap value for said virtual connection based on the transfer rate of said virtual connection;

incrementing a desired service time value that represents a previous desired service time of said virtual connection by said inter-cell gap value to generate a new desired service time value; and determining a cell slot that corresponds to said new desired service time value.

6. The method of claim 5 wherein:

said step of generating an inter-cell gap value comprises generating a first fixed-point number;

said step of incrementing a desired service time value that represents a previous desired service time of said virtual connection by said inter-cell gap value to generate a new desired service time value comprises the step of adding said first fixed-point number to a second fixed-point number to generate a third fixed-point number.

7. The method of claim 6 wherein said step of determining a cell slot that corresponds to said new desired service time value includes the steps of:

converting said third fixed-point number to an integer; and determining said cell slot based upon said integer.

8. The method of claim 2 further comprising the steps of:

for each of said first plurality of entries, during the cell slot associated with said entry, adding the virtual connections associated with said entry to a first service queue;

for each of said second plurality of entries, during the cell slot associated with said entry, adding the virtual connections associated with said entry to a second service queue;

servicing virtual connections in said first service queue and said second service queue based on the order in which said virtual connections appear in said first service queue and said second service queue.

9. The method of claim 8 wherein said first service queue is the same linked list as said second service queue.

10. The method of claim 8 wherein said first service queue is different from said second service queue, the method further comprising performing the following steps during each cell slot:

if said first service queue is not empty, performing the steps of servicing the virtual connection at the head of said first service queue;

removing the virtual connection from the head of said first service queue; and scheduling a new service time for said virtual connection using said first calendar;

if said first service queue is empty, performing the steps of servicing the virtual connection at the head of said second service queue;

removing the virtual connection from the head of said second service queue; and scheduling a new service time for said virtual connection using said second calendar.

11. A method, for use in a transmit device, for scheduling a service time for a virtual connection, comprising the steps of:

receiving a cell that includes a connection identifier corresponding to said virtual connection:

reading a fixed-point inter-cell gap value from a location in a table of fixed-point inter-cell gap values indicated by said connection identifier, said fixed-point inter-cell gap value being based on a transfer rate of said virtual connection;

incrementing a fixed-point desired service time value by said fixed-point inter-cell gap value to generate a new fixed-point desired service time value;

determining an entry in a calendar that corresponds to said new fixed-point desired service time value; and associating said virtual connection with said entry in said calendar.

12. The method of claim 11 further comprising the steps of:

generating said fixed-point inter-cell gap value by dividing a transfer rate of said transmit device by the transfer rate of said virtual connection; and storing said fixed-point inter-cell gap value in said table of fixed-point inter-cell gap values.

13. The method of claim 11 further comprising the step of selecting said calendar from a plurality of calendars based on the transfer rate of said virtual connection.

14. A transmit device comprising:

a cell buffer for storing cells to be transmitted over a plurality of virtual connections;

a memory having stored therein a plurality of calendars;

a transmission control unit configured to schedule service times for said plurality of virtual connections, wherein said transmission control unit is configured to select a calendar of said plurality of calendars for each of said plurality of virtual connections based on a transfer rate associated with each of said plurality of virtual connections; and schedule service times for each virtual connection using the calendar that was selected for said virtual connection based on the transfer rate of said virtual connection.

15. The transmit device of claim 14 wherein:

each of said calendars includes a plurality of entries;

each of said plurality of entries is associated with a cell slot;

the cell slot associated with each entry in said plurality of entries occurs a predetermined interval after the cell slot associated with the entry that immediately precedes said entry in said calendar;

said predetermined interval is different for each calendar of said plurality of calendars;

the transmission control unit is configured to schedule a service time for each virtual connection using the calendar that was selected for said virtual connection by:

determining a cell slot for said virtual connection; and associating said virtual connection with the entry of said selected calendar that is associated with said cell slot.

16. The transmit device of claim 15 wherein:

said transmission control unit is configured to determine a cell slot for said virtual connection by generating an inter-cell gap value for said virtual connection based on the transfer rate of said virtual connection;

incrementing a desired service time value that represents a previous desired service time of said virtual connection by said inter-cell gap value to generate a new desired service time value; and determining a cell slot that corresponds to said new desired service time value.

\* \* \* \* \*